Aug. 20, 1957    H. D. THOMPSON    2,803,468
INFANT'S AUTO SEAT-STROLLER
Filed Jan. 30, 1956

INVENTOR.
H. D. Thompson
BY Arthur H. Sturges
attorney

United States Patent Office 2,803,468
Patented Aug. 20, 1957

2,803,468

INFANT'S AUTO SEAT-STROLLER

Howard D. Thompson, Monmouth, Ill.

Application January 30, 1956, Serial No. 562,138

3 Claims. (Cl. 280—30)

This invention relates to seats and strollers for use in combination with motor vehicles and of the type adapted to be used either on a seat of a vehicle or as a stroller, and in particular a seat mounted in a frame with wheels on the lower corners and at the rear, and with an arcuate bar removably mounted on offset upper ends of rear members of the frame and adapted to be extended upwardly for use as a handle in using the device as a stroller and downwardly to be extended over the back of a seat of a vehicle when the device is used for a seat in a vehicle.

The purpose of this invention is to provide a carrier for small children that is adapted to be used as a stroller and also as a seat on the back of a seat of a vehicle.

Various types of strollers have been provided for infants and various types of seats have been used in motor vehicles for small children, and although some strollers are adapted to be used in motor vehicles it has been found difficult to suspend a stroller having wheels thereon from the back of a motor vehicle seat without removing or at least folding the wheels. With this thought in mind this invention contemplates a frame having spaced vertically disposed corner posts at the rear with wheels mounted on lower ends thereof in which the wheels are adapted to nest in the area at the intersection of the upper surface of the seat with the back with a handle depending from upper ends of the posts extended over the upper edge of the back and with a seat carried by an arcuate bar extended forwardly from the posts and supported by a V-shaped section of the frame extended upwardly from side rails forming the base of the seat.

The object of this invention is to provide an infant's seat that is adapted to be suspended from the back of a motor vehicle seat and that is also adapted to be used as a stroller.

Another object of the invention is to provide a stroller for small children that is adapted to be used on a seat of a vehicle and in which parts thereof are adapted to be folded to facilitate storing in a trunk of the vehicle.

Another important object of the invention is to provide a stroller adapted to be stored in a trunk of a motor vehicle which is adapted to be used on a seat of the vehicle without damaging the material of the seat.

A further object of the invention is to provide a stroller adapted to be used as a seat on a seat of a motor vehicle in which the device is of comparatively light weight construction so that the average individual may readily install it on a seat of a vehicle and may also readily remove it from the vehicle.

A still further object of the invention is to provide a stroller that is also adapted to be used as a seat on a seat of a motor vehicle in which the device is of a simple and economical construction.

With these and other objects and advantages in view the invention embodies tubular posts having arcuate upper ends with a U-shaped handle removably mounted on the upper ends, and with the lower ends extended horizontally to provide side rails, wheels rotatably mounted on the lower ends of the posts, a foot rest mounted on the side rails, and a seat carried by a substantially semi-circular rod mounted on the posts and supported at the outer edge with an inverted V-shaped frame extended from the ends of the side rails.

Other features and advantages of the invention will appear from the following description taken in connection with the drawings, wherein.

Figure 1:
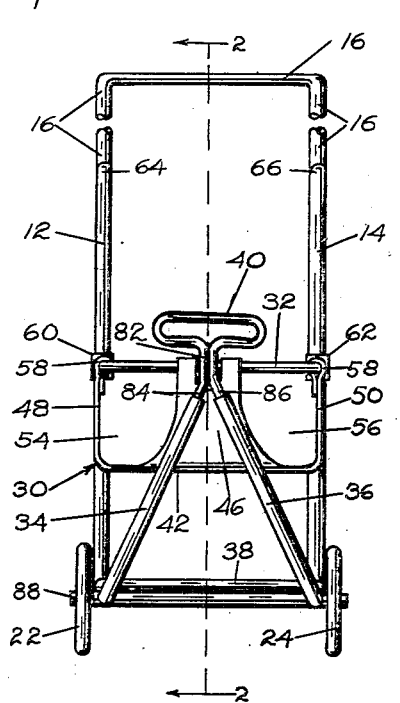
Figure 1 is a front elevational view looking toward the improved infant's motor vehicle seat and stroller.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 posts forming the back of the stroller, numeral 16 a handle removably mounted on extended ends 18 and 20 of the posts, numerals 22 and 24 wheels positioned at the lower ends of the posts, numerals 26 and 28 side rails forming the base of the device, numeral 30 a seat depending from a semi-circular rod 32, numerals 34 and 36 upwardly extended ends of the side rails, numeral 38 a foot rest carried by the side rails, and numeral 40 a handle having depending diverging arms positioned with the arms extended into upper ends of the ends 34 and 36.

Figure 2:
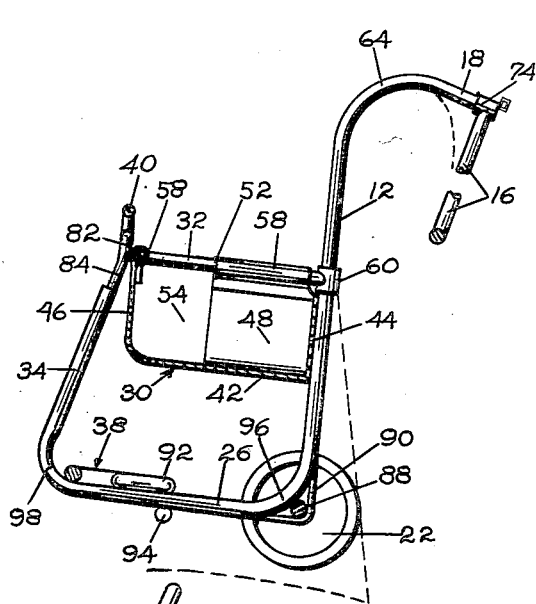
Figure 2 is a cross section through the device taken on line 2—2 of Figure 1 showing the device positioned on the back of a seat, the seat being shown in broken lines.

The seat 30 is provided with a bottom 42, a back 44, a front 46, and side panels 48 and 50, and, as shown in Figure 2, the side panels extend from the back to points 52, spaced from the front and providing leg openings 54 and 56. The upper edges of the back, front, and side panels are folded over providing a hem or tunnel 58 through which the rod 32 extends, and, also as shown in Figure 2, the rod 32 is mounted on the posts with collars 60 and 62, and supported at the front with the handle 40.

Figure 4:
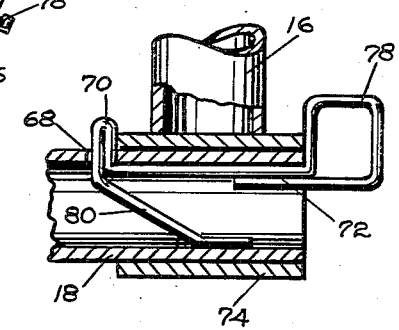
Figure 4 is a longitudinal section through the extended upper end of one of the posts with the parts shown on an enlarged scale illustrating one of the latches for retaining the handle on the posts, parts of the handle and post being broken away.

The upper ends of the posts are provided with arcuate sections 64 and 66 that fit snugly over the upper edge of the back of a seat, and with the handle 16 turned downwardly, as shown in Figure 2, the seat is retained in position upon the seat of a vehicle. The upper ends of the posts are provided with openings 68 through which keys 70 of latches 72 extend, as shown in Figure 4, the openings 68 being spaced inwardly from the ends 18 and 20 a distance equal to the length of collars 74 and 76 secured, such as by welding, to the ends of the handle 16. The outer ends of the latches are provided with loops 78, which extend beyond the ends of the tubes forming the posts, and the inner ends are provided with spring arms 80 which bear against opposite walls of the tubes, resiliently urging the keys 70 into the openings 68.

Figure 3:
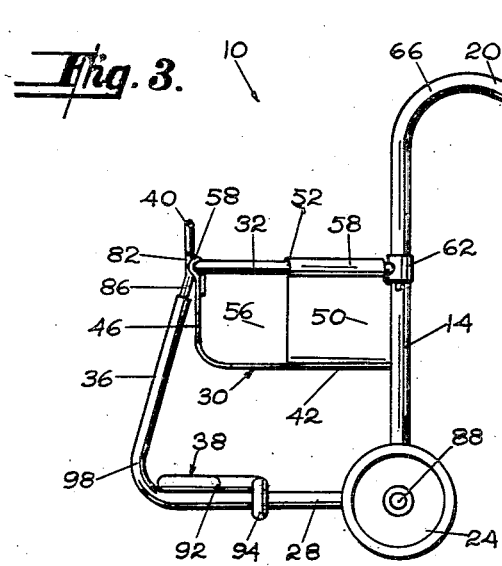
Figure 3 is a side elevational view of the seat and stroller.

With the latches formed in this manner the handle 16 is removed by pressing downwardly upon the loops 78 until the loop is level with the ends 18—20, at which time the latches are removed, and with the latches removed the collars 74 and 76 may slide from the ends 18 and 20 of the posts. The handle may then be turned over and replaced upon the ends, such as being turned from the position shown in Figure 2 to that shown in Figure 3, whereby the handle is in position to be gripped by hand to use the device as a stroller. With the handle in the adjusted position the latch is replaced whereby the handle will remain in place.

The ends of the handle 40, at the front of the seat, are folded under, meeting to form a stem 82, and from the lower end of the stem diverging arms 84 and 86, which are positioned in the ends 34 and 36 of the side rails, extend.

The wheels 22 and 24 are rotatably mounted on an axle 88 which is attached to the lower ends of the posts with angle brackets 90, and the foot rest 38 is provided with arcuate ends 92 from which U-shaped hooks 94 extend. The ends of the hooks 94 are in converging relation whereby the hooks are adapted to snap over the side rails 26 and 28 of the base of the device.

The lower ends of the posts are formed with arcuate sections 96 and with similar sections 98 at the forward ends of the side rails a streamlined design is provided and with the tubular material the seat or stroller may readily be carried through a door of a motor vehicle and also readily positioned upon the back of a seat in the vehicle by a mother, or the like without assistance. With the handle 16 folded downwardly the device may readily be placed in a trunk of a vehicle or stored in a comparatively small space.

By this means a device is provided that may readily be positioned on the back of a seat of a motor vehicle to provide a seat for infants in the vehicle, and which is also adapted to be removed from the vehicle and used as a stroller, the only change required to convert the device from a seat to a stroller, or from a stroller to a seat being that of changing the position of the handle 16.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent is:

1. An infant carrier comprising spaced vertically disposed posts, said posts having arcuate upper ends and said upper ends being adapted to rest upon the upper edge of the back of a seat, a U-shaped handle removably mounted on the upper ends of the posts, said handle being adapted to be extended upwardly to provide gripping means with the carrier used as a stroller, and also adapted to extend downwardly to provide means for securing the carrier upon the back of a vehicle seat, latches positioned in the upper ends of the posts for retaining the handle on the posts, wheels mounted on lower ends of the posts, a semi-circular rod mounted on intermediate parts of the posts and extended outwardly therefrom, a seat having leg openings therein depending from said rod, and a handle mounted on lower sections of the posts and positioned on the extended side of the seat.

2. In a carrier, the combination which comprises spaced vertically disposed posts, said posts having arcuate upper ends and said upper ends being formed to rest upon the upper edge of the back of a motor vehicle seat, a U-shaped handle having collars on the ends positioned with the collars slidably mounted on the arcuate upper ends of the posts, latches positioned in the upper ends of the posts, said latches being adapted to retain the collars in position upon the ends of the posts, wheels mounted on the lower ends of the posts, horizontally disposed rails extended from lower ends of the posts, converging sections extended upwardly from extended ends of the rails, a handle positioned in upper ends of the converging sections, a semi-circular rod mounted on intermediate portions of the posts and extended outwardly therefrom, a seat depending from said semi-circular rod, and means for supporting the extended side of the rod.

3. In a motor vehicle seat and stroller, the combination which comprises spaced vertically disposed posts, said posts being tubular and having arcuate upper ends, the upper ends of the posts being formed to rest upon the upper edge of the back of a seat, said upper ends having openings spaced inwardly from the ends thereof, a U-shaped handle having collars on ends thereof and said collars being positioned on the upper ends of the posts, latches having keys extended through the openings spaced from the ends of the posts and having loops extended from said ends of the posts, said keys and loops coacting to retain the collars in positions on the ends of the posts, wheels mounted on lower ends of the posts, horizontally disposed side rails extended forwardly from the lower ends of the posts, a foot rest mounted on the side rails, a semi-circular rod mounted on intermediate portions of the posts and extended forwardly therefrom, converging ends extended upwardly from extended ends of the side rails a handle having a stem with diverging arms extended from the lower end of the stem and positioned in the converging ends of the side rails, and a seat depending from said semi-circular rod.

References Cited in the file of this patent

UNITED STATES PATENTS

| 2,407,779 | Grove | Sept. 17, 1946 |
| 2,470,040 | Mackin | May 10, 1949 |
| 2,607,396 | Stambaugh | Aug. 19, 1952 |